United States Patent [19]

Hatori

[11] Patent Number: 4,900,113
[45] Date of Patent: Feb. 13, 1990

[54] OPTICAL SPECTRUM ANALYZER

[75] Inventor: Masami Hatori, Kanagawa, Japan

[73] Assignee: Fuji Photo Film Co., Ltd., Kanagawa, Japan

[21] Appl. No.: 221,970

[22] Filed: Jul. 20, 1988

[30] Foreign Application Priority Data

Jul. 20, 1987 [JP] Japan ................................ 62-180779

[51] Int. Cl.$^4$ ............................ G02B 6/10; G01J 3/40
[52] U.S. Cl. ............................... 350/96.13; 350/96.14;
350/358; 356/302; 356/303; 356/346
[58] Field of Search .................. 350/96.13, 96.14, 358;
356/302, 303, 346

[56] References Cited

U.S. PATENT DOCUMENTS 4,297,704 10/1981 Marom et al. .................... 350/96.13
4,595,253 6/1986 Yamashita et al. ............... 350/96.13

Primary Examiner—John D. Lee
Assistant Examiner—Georgia Y. Epps
Attorney, Agent, or Firm—Sughrue, Mion, Zinn, Macpeak & Seas

[57] ABSTRACT

An optical spectrum analyzer comprises an optical waveguide formed of a material allowing propagation of surface acoustic waves therethrough, and a surface acoustic wave generator for generating a surface acoustic wave, the frequency of which changes continuously and which advances in a direction intersecting an optical path of a guided optical wave as light-to-be-analyzed entered to the optical waveguide and advancing inside of the optical waveguide and diffracts and deflects the guided optical wave, in the optical waveguide. A photodetector is provided for detecting the optical level of the optical wave guided, deflected by the surface acoustic wave and radiated out of the optical waveguide. A frequency detector is provided for detecting the frequency of the surface acoustic wave at the time the photodetector detects the optical level of the optical wave guided, deflected by the surface acoustic wave and radiated out of the optical waveguide.

5 Claims, 4 Drawing Sheets

F I G. 2
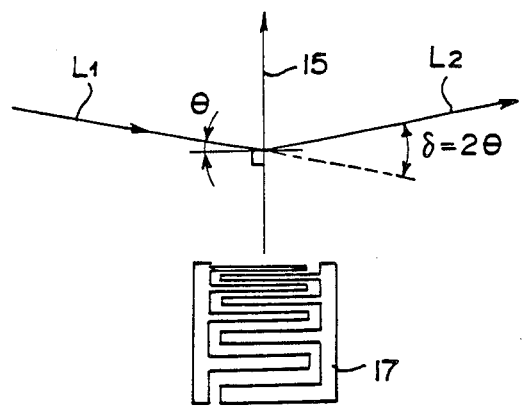
F I G. 3
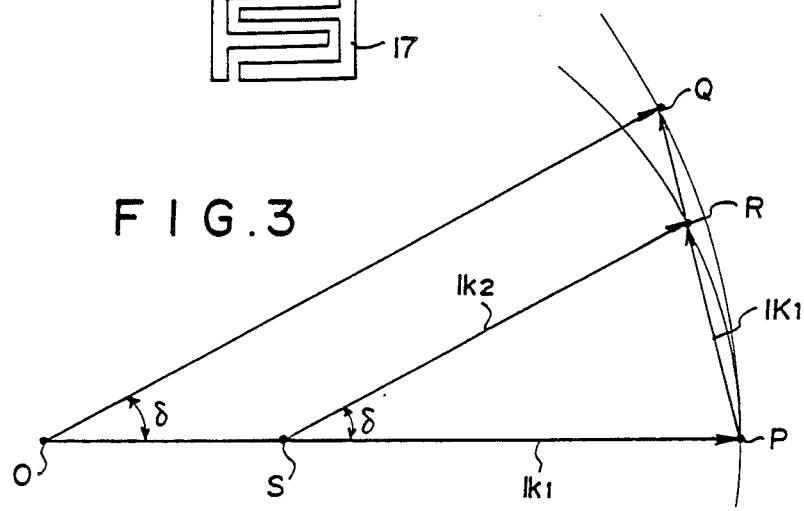
F I G. 4
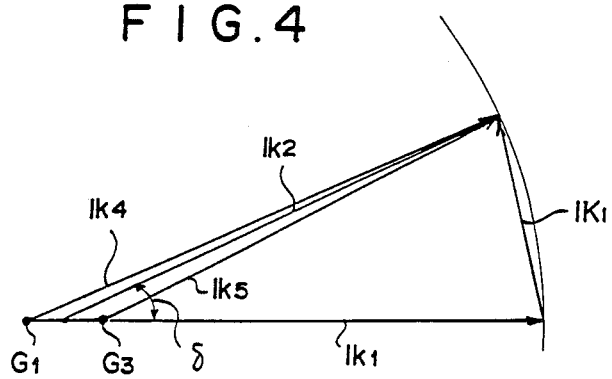

OPTICAL SPECTRUM ANALYZER

BACKGROUND OF THE INVENTION

1. Field of the Invention

This invention relates to an optical spectrum analyzer for analyzing an optical spectrum. This invention particularly relates to an optical spectrum analyzer for analyzing an optical spectrum by the utilization of acousto-optic effects.

2. Description of the Prior Art

Various optical spectrum analyzers for analyzing an optical spectrum have heretofore been known. As one of the optical spectrum analyzers which have widely been used in practice, for example, a Czerny-Turner type optical spectrum analyzer is known. The Czerny-Turner type optical spectrum analyzer is constituted to rotate a diffraction grating for diffracting light which is to be analyzed and which is irradiated to the diffraction grating, the diffracted light is thereby moved on a slit, and the optical spectrum is analyzed on the basis of the angle of rotation of the diffraction grating at the time of detection of the diffracted light across the slit. The optical spectrum analyzer of this type can analyze the optical spectrum at a high resolution.

However, the optical spectrum analyzer of the aforesaid type is large and heavy. Therefore, it cannot be easily processed and is not suitable as, for example, a portable device. Though various optical spectrum analyzers capable of being formed small and light have heretofore been proposed, many of them have the drawback that the resolution is low.

SUMMARY OF THE INVENTION

The primary object of the present invention is to provide an optical spectrum analyzer which is small and light, and which enables optical spectrum analysis at a high resolution.

Another object of the present invention is to provide an optical spectrum analyzer which exhibits high durability and reliability.

The present invention provides an optical spectrum analyzer comprising:

(1) an optical waveguide formed of a material allowing propagation of surface acoustic waves therethrough, (ii) a surface acoustic wave generating means for generating a surface acoustic wave, the frequency of which changes continuously and which advances in a direction intersecting an optical path of a guided optical wave as light-to-be analyzed entered to said optical waveguide and advancing inside of said optical waveguide and diffracts and deflects said guided optical wave, in said optical waveguide, (iii) a light detection means for detecting the optical level of said optical wave guided, deflected by said surface acoustic wave and radiated out of said optical waveguide, and (iv) a frequency detection means for detecting the frequency of said surface acoustic wave at the time said light detection means detects the optical level of said optical wave guided, deflected by said surface acoustic wave and radiated out of said optical waveguide.

When intersecting with the surface acoustic wave propagating through the optical waveguide, the optical wave guided through the optical waveguide is diffracted and deflected by the acousto-optic interaction between the surface acoustic wave and the guided optical wave. The deflection angle $\delta$ of the guided optical wave caused by the acousto-optic interaction is expressed as $\delta = 2\theta$ wherein $\theta$ denotes the angle of incidence of the guided optical wave with respect to the direction of advance of the surface acoustic wave. Also, the formula $$2\theta = 2\sin^{-1}\frac{\lambda}{2Ne \cdot \Lambda} = 2\sin^{-1}\frac{\lambda \cdot f}{2Ne \cdot v} \quad (1)$$

applies wherein $\lambda$ and $Ne$ respectively denote the wavelength and the effective refractive index of the guided optical wave, and $\Lambda$, $f$ and $v$ respectively denote the wavelength, the frequency and the velocity of the surface acoustic wave. Since $Ne$ and $v$ are constant, the wavelength $\lambda$ of the guided optical wave, i.e. the light which is to be analyzed, can be calculated when the angle of incidence $\theta$ and the frequency $f$ at the time the Bragg condition expressed by Formula (1) is satisfied and the guided optical wave is diffracted most efficiently are known.

Also, in the case where the guided optical wave (i.e. the light which is to be analyzed) contains a plurality of spectrum components the wavelengths of which are very close to one another, the spectrum components can be separated from one another by the diffraction effect of the surface acoustic wave. Therefore, the spectrum components can be analyzed accurately even though the wavelengths thereof are close to one another by, for example, providing a pinhole plate or the like prior to the photodetector so that the spectrum components are detected independently of one another.

With the optical spectrum analyzer in accordance with the present invention, the optical spectrum can be analyzed at a high resolution. Also, with the optical spectrum analyzer in accordance with the present invention wherein the light which is to be analyzed is entered to the optical waveguide and the optical wave thus guided through the optical waveguide is diffracted by the surface acoustic wave, the optical spectrum analyzer can be fabricated small and light. Moreover, since no mechanical operating part is provided, the optical spectrum analyzer in accordance with the present invention exhibits high durability and reliability.

BRIEF DESCRIPTION OF THE DRAWINGS

FIG. 2 is an enlarged plan view showing a part of the embodiment shown in FIG. 1, FIG. 3 is an explanatory view showing the deflection of the optical wave in the embodiment shown in FIG. 1, FIG. 4 is an explanatory view showing the separation of the optical spectrum in the optical spectrum analyzer of the present invention.

DESCRIPTION OF THE PREFERRED EMBODIMENTS

The present invention will hereinbelow be described in further detail with reference to the accompanying drawings.

Figure 1:
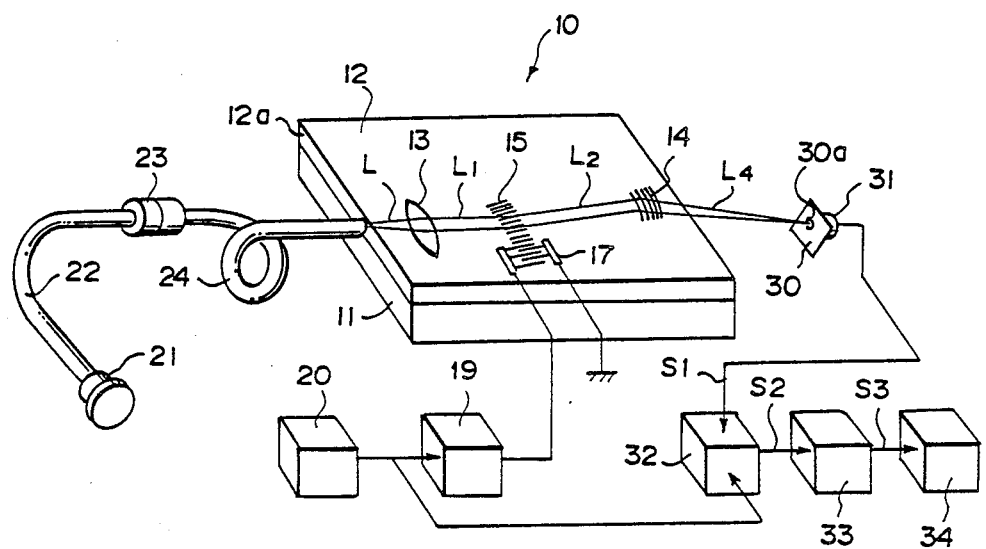
FIG. 1 is a schematic perspective view showing an embodiment of the optical spectrum analyzer in accordance with the present invention.

With reference to FIG. 1, an optical spectrum analyzer 10 comprises an optical waveguide 12 formed on a substrate 11, an optical waveguide lens 13 formed on the optical waveguide 12, and a focusing grating coupler (hereinafter abbreviated to FGC) 14 for radiation of the optical wave. The optical spectrum analyzer 10 also comprises a chirped interdigital transducer (hereinbelow abbreviated to chirped IDT) 17 for generating a surface acoustic wave 15 which advances in a direction intersecting the optical path of the guided optical wave advancing between the lens 13 and the FGC 14, a high-frequency amplifier 19 for applying a high-frequency alternating voltage to the chirped IDT 17 for the generation of the surface acoustic wave 15, and a sweeper 20 for continuously changing (sweeping) the frequency of the alternating voltage.

A pinhole plate 30 and a photodetector 31 constituted by a photodiode or the like for measuring the level of an optical wave L4 radiated out of the FGC 14 for radiation of the optical wave are provided at the position upon which the radiated optical wave L4 impinges. The optical amount signal S1 generated by the photodetector 31 is fed to a sampling circuit 32 which will be described later, and the frequency detection signal S2 generated by the sampling circuit 32 is fed to a control circuit 33.

In this embodiment, by way of example, the substrate 11 is formed of a LiNbO$_3$ wafer, and the optical waveguide 12 is formed by overlaying a Ti diffusion film on the surface of the wafer. As the substrate 11, it is also possible to use a crystal substrate formed of sapphire, Si or the like. Besides the Ti diffusion, the optical waveguide 12 may also be formed by sputtering or vacuum evaporation of a different material onto the surface of the substrate 11. Various optical waveguides are described in detail in, for example, T. Tamir, "Integrated Optics", Topics in Applied Physics, Vol. 7, Springer-Verlag, 1975, and Nishibara, et al., "Integrated Optical Circuit", Ohm, 1985. In the present invention, any of the known optical waveguides may be used as the optical waveguide 12. However, the optical waveguide 12 must be formed of a material such as the Ti diffusion film which allows propagation of the surface acoustic waves therethrough. The optical waveguide 12 may also be constituted by two or more layers.

The chirped IDT 17 may be formed by, for example, coating a positive type electron beam resist onto the surface of the optical waveguide 12, depositing a thin Au conductive film by vacuum evaporation onto the positive type electron beam resist, drawing a transducer pattern with an electron beam, removing the thin Au film, carrying out development, depositing a thin Cr film and a thin Al film by vacuum evaporation, and then carrying out lift-off in an organic solvent. In the case where the substrate 11 and the optical waveguide 12 are made of a piezo-electric material, the surface acoustic wave 15 can also be generated when the chirped IDT 17 is disposed directly inside of the optical waveguide 12 or on the substrate 11. In other cases, a piezo-electric thin film of ZnO or the like may be formed at a part of the substrate 11 or at a part of the optical waveguide 12 by vacuum evaporation, sputtering, or the like, and the chirped IDT 17 may be disposed on the piezo-electric thin film.

An optical wave L which is produced by a light source 21 constituted by a semiconductor laser or the like and which is to be spectrum-analyzed is introduced into the optical waveguide 12 from its edge face 12a via an optical fiber 22 connected with the light source 21, a coupler 23 and an optical fiber 24 directly coupled with the edge face 12a of the optical waveguide 12. The optical wave L (divergent wave) is collimated by the optical waveguide lens 13 and is guided as indicated by L1 inside of the optical waveguide 12. When the Bragg condition expressed as Formula (1) is satisfied, the guided optical wave L1 is diffracted (Bragg diffraction) as shown in FIG. 1 by the acousto-optic interaction with the surface acoustic wave 15 generated by the chirped IDT 17. The guided optical wave L2 thus diffracted is converged and radiated out of the optical waveguide 12 by the effect of the FGC 14.

Diffraction and deflection of the guided optical wave will hereinbelow be described in detail with reference to FIGS. 2 and 3. FIG. 2 shows the region of the chirped IDT 17 in detail, and FIG. 3 shows the wave vectors of the guided optical wave L1 and the surface acoustic wave 15. As shown in FIG. 2, the guided optical wave L1 advances at a predetermined angle of incidence $\theta$ with respect to the direction of advance of the surface acoustic wave 15. Specifically, as shown in FIG. 3, in the case where the Bragg condition expressed as Formula (1) is satisfied, there obtains the formula $$k_1 + K_1 = k_2 \qquad (2)$$

wherein $k_1$ and $k_2$ respectively denote the wave vector of the guided optical wave L1 prior to the incidence upon the surface acoustic wave 15 and the wave vector of the guided optical wave L2 after the passage through the surface acoustic wave 15, and $K_1$ denotes the wave vector of the surface acoustic wave 15. Thus the deflection angle $\delta$ of the guided optical wave L2 with respect to the guided optical wave L1 is equal to $2\theta$. In the case where the angle of incidence $\theta$ is constant as mentioned above, the deflection angle $\delta$ at the time Formula (2) applies is also constant. Therefore, the optical wave L4 radiated out of the optical waveguide 12 with the Bragg condition being satisfied perfectly is radiated in a predetermined direction. The pinhole plate 30 prior to the photodetector 31 is provided so that the optical wave L4 radiated in the predetermined direction passes through a pinhole 30a of the pinhole plate 30.

On the other hand, there obtains the formula $$|k_1| = 2\pi/\lambda$$

wherein $\lambda$ denotes the wavelength of the guided optical wave L1 (i.e. light which is to be analyzed), and $\Lambda$ denotes the wavelength of the surface acoustic wave 15. Also, the wavelength of the guided optical wave L2 is equal to $\lambda$, and therefore the formula $$|k_1| = |k_2| = 2\pi/\lambda$$

applies. Therefore, as the angle of incidence $\theta$ is fixed, only a single value of $|K_1| = 2\pi/\Lambda$ that satisfies Formula (2) is present per $|k_1|$. Accordingly, the wavelength $\lambda$ can be calculated from the value of $|K_1|$, i.e.

from the value of the wavelength Λ of the surface acoustic wave 15, at the time Formula (2) applies (i.e. at the time the optical wave L4 passes through the pinhole 30a and is detected by the photodetector 31).

Though the wavelength λ can be calculated based on Formula (1), it can also be calculated when the angle of incidence θ and the refractive index Ne of the optical waveguide 12 with respect to the guided optical wave L1 are unknown. Specifically, a reference guided optical wave the wavelength of which is known as λref is entered to the optical waveguide 12. At this time, the reference guided optical wave is diffracted by a reference surface acoustic wave having a wavelength Λref. With reference to FIg. 3, the wave vector of the reference guided optical wave is denoted by OP, the wave vector of the reference surface acoustic wave having the wavelength Λref is denoted by PQ, and the wave vector of the reference guided optical wave after being diffracted is denoted by OQ. In this case, ΔOPQ ΔSPR, and therefore the formula $$\frac{|k_1|}{OP} = \frac{|K_1|}{PQ}$$

applies. Since $OP = 2\pi/\lambda\text{ref}$, $PQ = 2\pi/\Lambda\text{ref}$, there obtains the formula $$\lambda = \lambda\text{ref}(\Lambda/\Lambda\text{ref})$$

When the velocity and the frequency of the surface acoustic wave 15 are denoted by v and f respectively, and the velocity and the frequency of the reference surface acoustic wave are denoted by vref and fref respectively, the formulas $$v = f\Lambda, \quad v\text{ref} = f\text{ref} \cdot \Lambda\text{ref}, \quad v = v\text{ref}$$

apply. Consequently, there obtains the formula $$\lambda = \lambda\text{ref}(f\text{ref}/f) \quad (3)$$

Accordingly, the wavelength λ of the light which is to be analyzed can be calculated based on Formula (3) by investigating in advance the wavelength λref of the reference guided optical wave and the frequency fref of the references surface acoustic wave.

In the course of the optical spectrum analysis, the frequency of the high-frequency alternating voltage fed to the chirped IDT 17 is swept continuously by the sweeper 20 from fmin to fmax. In the case where fmin and fmax are adjusted to appropriate values when the frequency of the alternating voltage, i.e. the frequency of the surface acoustic wave 15, is swept, the diffraction of the guided optical wave L1 is achieved most efficiently at a frequency f (where $f\text{min} \leq f \leq f\text{max}$) of the surface acoustic wave satisfying Formula (1). At this time, the optical wave L4 radiated out of the optical waveguide 12 passes through the pinhole 30a and is detected by the photodetector 31. The sampling circuit 32 connected with the sweeper 20 detects the frequency of the alternating voltage, i.e. the frequency f of the surface acoustic wave, at the time the optical level signal S1 generated by the photodetector 31 reaches a level not lower than a predetermined level, i.e. at the time the Bragg condition is satisfied and the guided optical wave L1 is diffracted. The signal S2 representing the frequency f is fed to the control circuit 33 which stores the wavelength λref of the reference guided optical wave and the frequency fref of the reference surface acoustic wave. The control circuit 33 calculates the wavelength λ of the guided optical wave L1 based on Formula (3) by use of the wavelength λref, the frequency fref and the frequency f of the surface acoustic wave which the signal S2 represents.

The signal S3 representing the wavelength λ of the guided optical wave L1 (i.e. the light which is to be analyzed) thus calculated is fed by the control circuit 33 to a display device 34 constituted by a liquid crystal display device, a phototube display device or the like, and the value of the wavelength λ is displayed by use of the signal S3.

The display device 34 may be replaced by an appropriate recording device or the like. Also, instead of calculating the wavelength λ of the light which is to be analyzed by use of the control circuit 33, the calculation may be carried out manually. Specifically, the wavelength λ of the light which is to be analyzed can be calculated insofar as at least the frequency f of the surface acoustic wave at the time the photodetector 31 detects an optical amount of a level not lower than the predetermined level is detected.

The optical spectrum analyzer in accordance with the present invention can analyze the spectrum components at a high resolution when the light which is to be analyzed is composed of a plurality of the spectrum components the wavelengths of which are very close to one another. This feature will hereinbelow be described in detail. By way of example, the light which is to be analyzed is composed of the spectrum components having wavelengths λ1, λ2 and λ3 ($\lambda 1 < \lambda 2 < \lambda 3$) which are close to one another. Also, as shown in FIG. 4, the Bragg condition is satisfied between the guided optical wave having the middle wavelength λ2 and the surface acoustic wave 15, and the diffracted optical wave is radiated in the direction of the vector 2. In this case, the guided optical wave having the wavelength λ1 and the guided optical wave having the wavelength λ3 nearly (though not perfectly) satisfy the Bragg condition with respect to the surface acoustic wave 15. Therefore, the guided optical wave having the wavelength λ1 and the guided optical wave having the wavelength λ3 are also diffracted by the surface acoustic wave 15 and radiated out of the optical waveguide 12. However, as shown in FIG. 4, the angles of diffraction of the guided optical wave having the wavelength λ1 and the guided optical wave having the wavelength λ3 are different from the angle of diffraction of the guided optical wave having the wavelength λ2, and coincide with a vector 4 and a vector 5 respectively. (In FIG. 4, G1 and G3 denote the start points of the wave vectors of the guided optical wave having the wavelength λ1 and the guided optical wave having the wavelength λ3 respectively.) Therefore, the optical wave radiated out of the optical waveguide 12 is separated to the spectrum components. As the spectrum components are perfectly separated from one another on the pinhole plate 30, when the frequency of the alternating voltage is swept, three optical wave spots move on the pinhole plate 30 and the optical waves having the different wavelengths sequentially pass through the pinhole 30a independently of one another.

Figure 5:
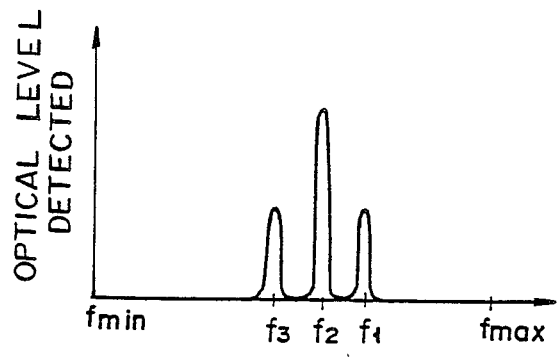
FIG. 5 is a graph showing the relationship between the optical level detected and the frequency of the surface acoustic wave in the optical spectrum analyzer in accordance with the present invention.

Accordingly, the relationship between the optical level detected by the photodetector 31 and the frequency of the alternating voltage, i.e. the frequency of the surface acoustic wave, is as shown in FIG. 5. Specifically, the spectrum components having the wavelengths λ1, λ2 and λ3 are detected independently of one another at the time the frequency of the surface acoustic wave is equal to f1, f2 and f3 respectively. When the frequency f1, the frequency f2 and the frequency f3 are detected, the wavelengths λ1, λ2 and λ3 can be calculated in the same manner as mentioned above.

Figure 6:
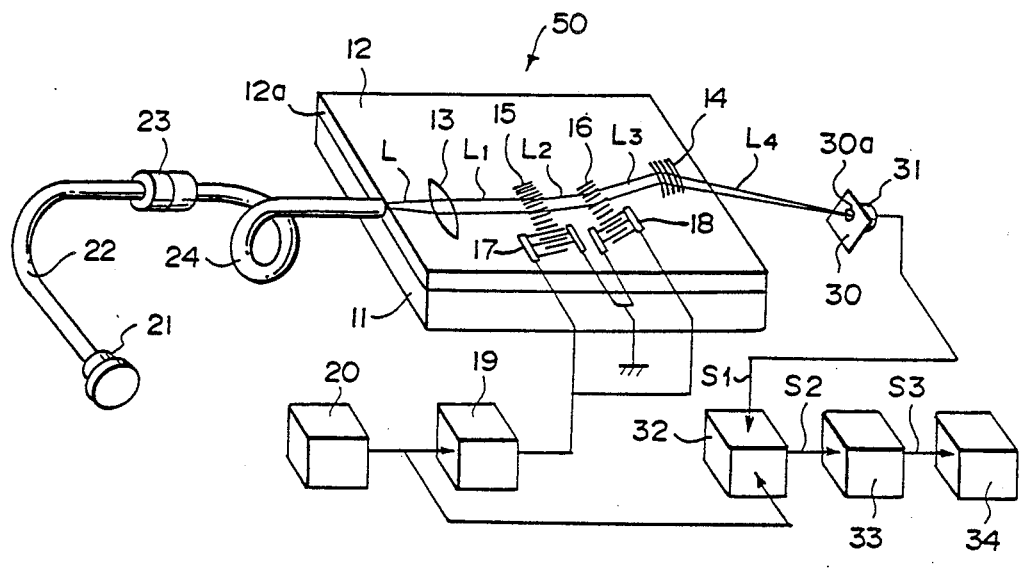
FIG. 6 is a schematic perspective view showing another embodiment of the optical spectrum analyzer in accordance with the present invention.
Figure 7:
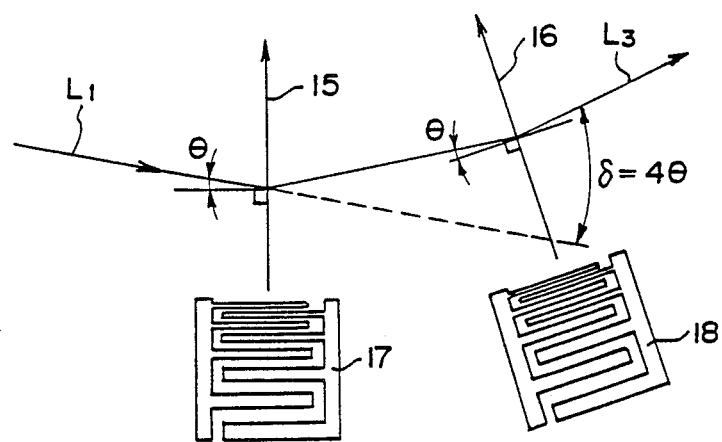
FIG. 7 is an enlarged plan view showing a part of the embodiment shown in FIG. 6.
Figure 8:
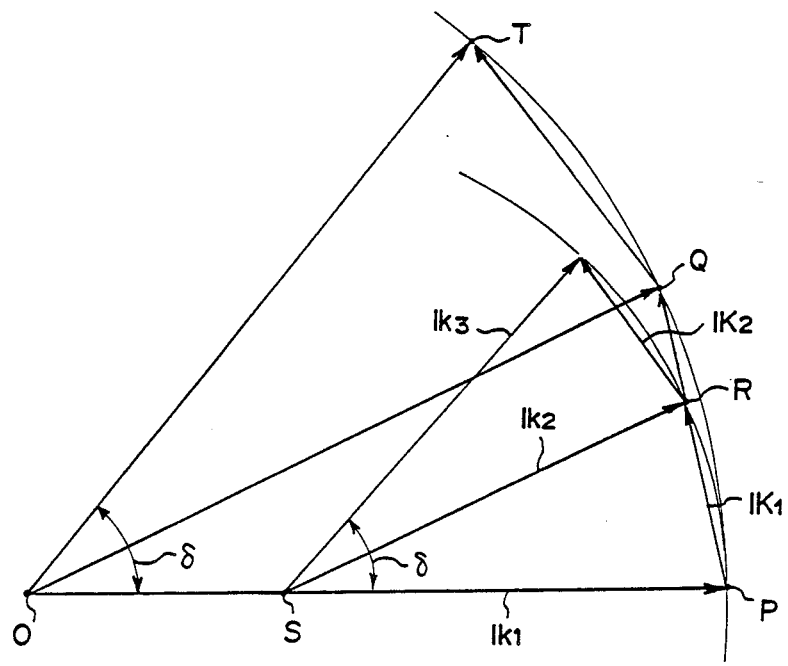
FIG. 8 is an explanatory view showing the deflection of the optical wave in the embodiment shown in FIG. 6.

Another embodiment of the optical spectrum analyzer in accordance with the present invention will hereinbelow be described with reference to FIGS. 6, 7 and 8. In FIGS. 6, 7 and 8, similar elements are numbered with the same reference numerals with respect to FIGS. 1, 2 and 3. With reference to FIGS. 6 and 7, in an optical spectrum analyzer 50, a second chirped IDT 18 is provided as well as the aforesaid chirped IDT 17 (first chirped IDT) on the optical waveguide 12. The second chirped IDT 18 generates a second surface acoustic wave 16 for diffracting and deflecting the guided optical wave L2, which has been diffracted and deflected by the first surface acoustic wave 15, in a direction that amplifies the deflection of the guided optical wave L2. In this embodiment, swept alternating voltages having equal frequencies are applied by the high-frequency amplifier 19 to the first chirped IDT 17 and the second chirped IDT 18. Therefore, the frequencies of the first surface acoustic wave 15 and the second surface acoustic wave 16 are changed continuously while attaining values equal to each other.

In the case where the double diffraction is carried out, there obtain the formulas $$\vec{1} + \vec{\kappa}_1 = \vec{2}$$

$$\vec{2} + \vec{\kappa}_2 = \vec{3}$$

wherein $\vec{1}$, $\vec{2}$ and $\vec{3}$ respectively denote a wave vector of the guided optical wave L1, a wave vector of the guided optical wave L2 after being diffracted by the first surface acoustic wave 15, and a wave vector of a guided optical wave L3 after being diffracted by the second surface acoustic wave 16, and $\vec{\kappa}_1$ and $\vec{\kappa}_2$ respectively denote wave vectors of the first surface acoustic wave 15 and the second surface acoustic wave 16. Also, in the case where the first chirped IDT 17 and the second chirped IDT 18 are provided so that the angle of incidence of the guided optical wave L1 with respect to the first surface acoustic wave 15 and the angle of incidence of the guided optical wave L2 with respect to the second surface acoustic wave 16 are equal to each other (θ), the wavelength λ of the guided optical wave L (i.e. the light which is to be analyzed) can be calculated based on the values of the frequencies f of the first surface acoustic wave 15 and the second surface acoustic wave 16, i.e. the values of the frequencies of the alternating voltages fed to the first chirped IDT 17 and the second chirped IDT 18.

In the case where the reference guided optical wave and the reference surface acoustic wave as mentioned above are used (a first reference surface acoustic wave and a second reference surface acoustic wave having equal frequencies are used in this embodiment), the wavelength λ of the light which is to be analyzed can be calculated based on Formula (3). Specifically, with reference to FIG. 8, the wave vector of the reference guided optical wave is denoted by OP, the wave vector of the first reference surface acoustic wave is denoted by PQ, and the wave vector of the reference guided optical wave after being diffracted by the first reference surface acoustic wave is denoted by OQ. Also, the wave vector of the second reference surface acoustic wave is denoted by QT, and the wave vector of the reference guided optical wave after being diffracted by the second reference surface acoustic wave is denoted by OT. In this case, ΔOPQ ∽ ΔSPR, and therefore Formula (3) applies.

However, in the embodiment shown in FIG. 6, the deflection angle δ of the guided optical wave L3 after being diffracted twice with respect to the guided optical wave L1 is equal to 4θ wherein θ denotes the angle of incidence of the guided optical wave L1 with respect to the first surface acoustic wave 15. The deflection angle is two times the deflection angle δ=2θ obtained in the embodiment shown in FIG. 1. Therefore, with the embodiment shown in FIG. 6, the resolution of the spectrum analysis can be increased over the resolution possible with the embodiment shown in FIG. 1. This effect will hereinbelow be described in detail.

By way of example, in FIG. 4, the angle of the vector $\vec{2}$ with respect to the vector $\vec{4}$ or the vector $\vec{5}$ is larger as the angle of the vector $\vec{2}$ with respect to the vector $\vec{1}$ increases, i.e. as the angle of diffraction of the guided optical wave by the surface acoustic wave increases. Specifically, differences among the angles of radiation of several optical waves radiated simultaneously out of the optical waveguide 12 are larger as the deflection angle δ of the guided optical wave increases. As a result, the optical waves are separated with larger intervals intervening therebetween on the pinhole plate 30. In this case, spectrum components having wavelengths closer to one another can be separated. Consequently, the resolution of the spectrum analysis is improved as the deflection angle δ increases. This effect will be described below in more detail. As mentioned above, the deflection angle δ in the case of the double diffraction is equal to 4θ. Therefore, Formula (1) gives $$\delta = 4 \sin^{-1} \frac{\lambda \cdot f}{2 Ne \cdot v}$$

Accordingly, a change amount Δδ of the deflection angle with respect to a small wavelength change amount Δλ is approximately represented by the formula $$\Delta\delta = 4 \frac{\Delta\lambda \cdot f}{2 Ne \cdot v}$$

In the case where an X-cut LiNbO$_3$ optical waveguide 12 is considered, Ne=2.2, v=3463 m/s, f=1.5 GHz, and a distance l between the diffraction point and the pinhole plate 30 is equal to 90 mm, a 10 μm beam spot is formed on the pinhole when a beam diameter D of the incident optical wave is equal to 15 mm, and the separation amount between beam spots on the pinhole plate 30 is approximately represented by l·Δδ. The formula $$l \cdot \Delta\delta = 35,400 \times \Delta\lambda$$

applies. In air, the formula $$l \cdot \Delta\delta = 2.2 \times 35,400 \times \Delta\lambda$$
$$= 77,880 \times \Delta\lambda$$

applies. Two optical wave beams can be separated from each other and detected independently when the separation amount $l \cdot \Delta \delta$ between the beam spots is at least equal to the beam spot diameter. Therefore, in the case where the optical wave L4 is converged by the FGC 14 for radiation of the optical wave to a spot diameter of, for example, 10 μm which is equal to a core diameter of an optical fiber for optical communication, two such optical waves that the difference between the wavelengths thereof is equal to $\Delta\lambda$ can be separated from each other and detected independently when $$77.880 \times \Delta\lambda = 10\mu m.$$

From this formula, $\Delta\lambda$ is approximately equal to 0.13 nm. Thus the embodiment shown in FIG. 6 can carry out the spectrum analysis in the unit of approximately 0.1 nm.

In the case where the optical spectrum analyzer is constituted for analyzing an optical spectrum of, for example, a semiconductor laser beam, $\Delta\lambda$ is generally on the order of several nanometers, and it is only necessary that $\Delta\lambda$ of 100 nm be considered. Therefore, when the frequency of the surface acoustic wave is equal to approximately 1.5 GHz, the frequency band may be from approximately 50 MHz to approximately 100 MHz.

In the embodiment shown in FIG. 6, the frequencies of the first surface acoustic wave 15 and the second surface acoustic wave 16 are always equal to each other. However, the frequencies of the first surface acoustic wave 15 and the second surface acoustic wave 16 may attain different values with the ratio therebetween being maintained constant.

Also, the guided optical wave as the light which is to be analyzed may be diffracted three times or more by three or more surface acoustic waves. As mentioned above, the resolution of spectrum analysis is improved as the deflection angle $\delta$ of the guided optical wave is increased. Therefore, when the guided optical wave is diffracted many times, the resolution of spectrum analysis can be increased without the frequencies of the surface acoustic waves being increased so much.

I claim:

1. An optical spectrum analyzer comprising:
   (i) an optical waveguide formed of a material allowing propagation of surface acoustic waves therethrough,
   (ii) a surface acoustic wave generating means for generating a surface acoustic wave, including means for changing a frequency of said surface acoustic wave continuously, wherein said surface acoustic wave advances in a direction intersecting an optical path of a guided optical wave as light-to-be analyzed entered to said optical waveguide and advancing inside of said optical waveguide and diffracts and deflects said guided optical wave, in said optical waveguide,
   (iii) a focusing grating coupler for converging and radiating said diffracted and deflected guided optical wave,
   (iv) a light detection means for detecting the optical level of said guided optical wave, deflected by said surface acoustic wave and radiated out of said optical waveguide, said light detection means including a pinhole plate for receiving an output of said focusing grating coupler and having a pinhole formed therein through which at least a portion of the optical wave converged by said optical grating coupler passes, said light detection means receiving said portion and detecting said optical level accordingly, and
   (v) a frequency detection means for detecting the frequency of said surface acoustic wave at the time said light detection means detects the optical level of said optical wave guided, deflected by said surface acoustic wave and radiated out of said optical waveguide.

2. An optical spectrum analyzer as defined in claim 1 wherein said surface acoustic wave generating means comprises:
   (a) a first surface acoustic wave generating means for generating a first surface acoustic wave, which diffracts and deflects said guided optical wave, in said optical waveguide, and
   (b) a second surface acoustic wave generating means for generating a second surface acoustic wave, which advances in a direction intersecting the optical path of said guided and diffracted optical wave and diffracts and deflects said guided and diffracted optical wave in a direction that amplifies the deflection caused by said diffraction, in said optical waveguide.

3. An optical spectrum analyzer as defined in claim 1 wherein said surface acoustic wave generating means comprises a chirped interdigital transducer comprising a plurality of transducer fingers separated by transducer finger intervals, in which said transducer finger intervals are changed stepwise, and a drive for applying an alternating voltage the frequency of which changes continuously to said chirped interdigital transducer.

4. An optical spectrum analyzer as defined in claim 2 wherein each of said first surface acoustic wave generating means and said second surface acoustic wave generating means comprises a chirped interdigital transducer comprising a plurality of transducer fingers separated by transducer finger intervals, in which said transducer finger intervals are changed stepwise, and a driver for applying an alternating voltage the frequency of which changes continuously to said chirped interdigital transducer.

5. An optical spectrum analyzer as defined in claim 4 further comprising a single common driver for operating said chirped interdigital transducer in each of said first surface acoustic wave generating means and said second surface acoustic wave generating means.

* * * * *